Patented June 1, 1937

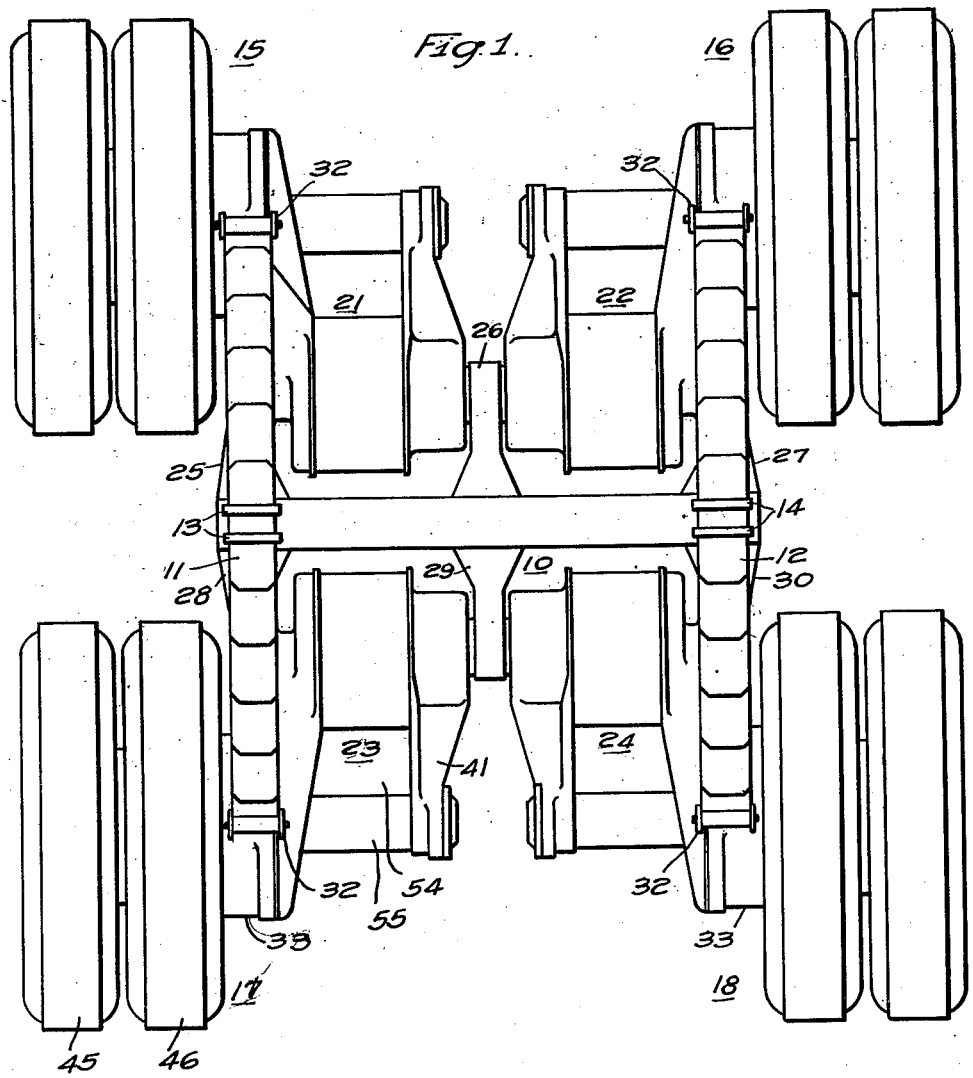

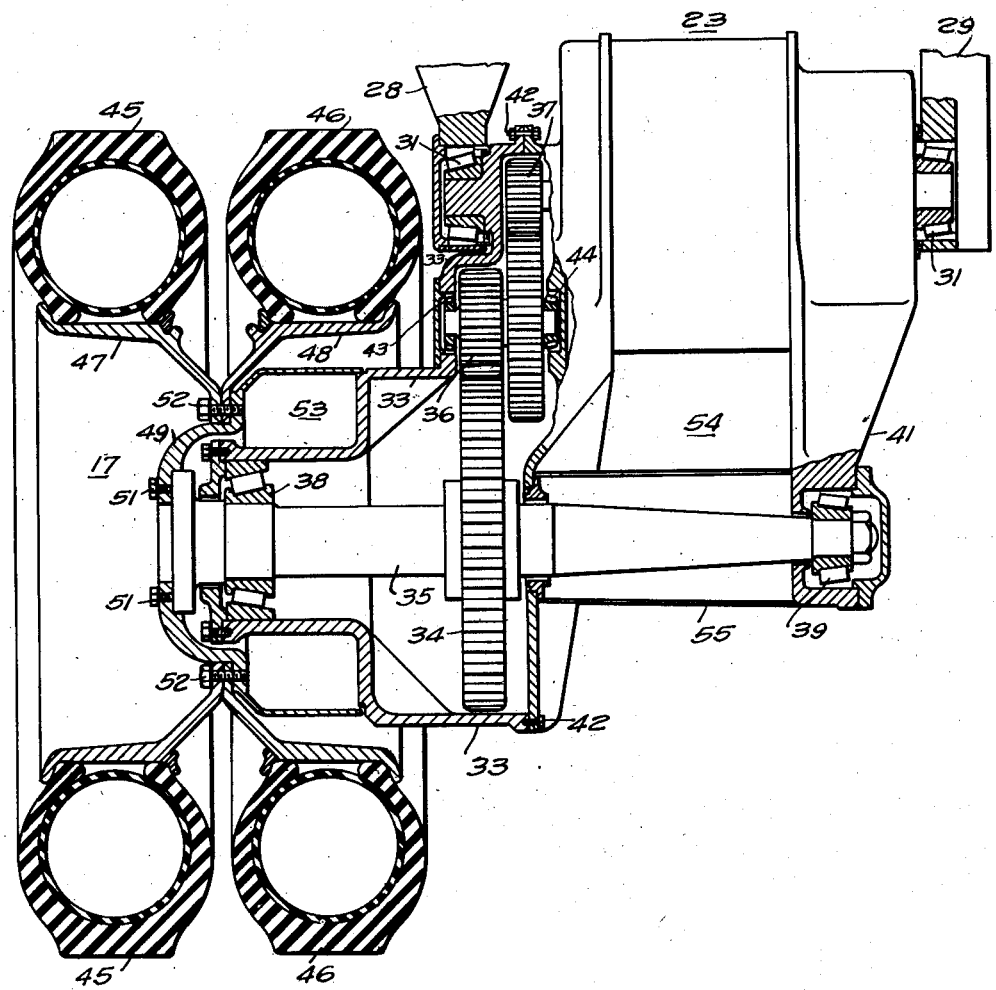

2,082,001

UNITED STATES PATENT OFFICE 2,082,001

VEHICLE STRUCTURE

Harold F. Hanson, Pittsburgh, Pa., assignor to Westinghouse Electric & Manufacturing Company, East Pittsburgh, Pa., a corporation of Pennsylvania Application August 8, 1934, Serial No. 738,984

4 Claims. (Cl. 180—22)

My invention relates, generally, to vehicle structures and, more particularly, to driving mechanisms for electrically-propelled buses such as trolley buses and gas-electric or oil-electric buses.

Heretofore, electrically-propelled buses of the four-wheel drive type have been provided with two axles, one for each pair of driving wheels, and a motor for driving each one of the axles. This type of drive requires the provision of differential gearing mechanisms on the axles which not only increase the weight of the bus but also frequently become a source of trouble after the bus has been in service for some time, especially on the larger and heavier buses in which it is necessary to transmit a large amount of power to the driving wheels.

An object of my invention, generally stated, is to provide a driving mechanism for electrically-propelled vehicles which shall be simple and efficient in operation and which may be economically manufactured and installed.

A more specific object of my invention is to provide a driving mechanism for a vehicle having a plurality of driving wheels which shall not require the provision of differential gearing.

Another object of my invention is to provide an individual motor for each driving wheel of a four-wheel drive vehicle.

Other objects of my invention will be explained fully hereinafter or will be apparent to those skilled in the art.

In accordance with the preferred embodiment of the invention, four electric motors are provided, one for each wheel of a four-wheel drive vehicle truck. Each wheel is independently suspended on a bell crank arrangement oscillating about the center line of the motor which drives the wheel through a double reduction gear unit. The gear case constitutes a support for the wheel axle, thereby insuring that an accurate gear center distance will be maintained.

For a fuller understanding of the nature and objects of the invention, reference may be had to the following detailed description taken in conjunction with the accompanying drawings, in which:

Figure 1 is a top plan view of a four-wheel drive truck constructed in accordance with my invention; and Fig. 2 is an enlarged view, partially in plan and partially in section, of one of the wheels and motors shown in Fig. 1.

Referring to the drawings, and particularly to Fig. 1, the vehicle truck therein illustrated comprises a transversely disposed frame member 10 on top of which is mounted a pair of longitudinally disposed spring members 11 and 12, each of which may be composed of a plurality of leaves which are secured to the frame member by clamping bolts 13 and 14, respectively. It will be understood that the frame of the vehicle body (not shown) may be mounted on top of the springs 11 and 12, the vehicle truck, herein described, thereby serving to support a portion of the vehicle body and to propel the vehicle.

In the embodiment of the invention illustrated, four wheels 15, 16, 17 and 18 are provided for driving the vehicle, each wheel being of the dual tire type. In order to overcome the disadvantages resulting from the use of differential gearing, a motor is provided for independendently driving each of the wheels. Accordingly, a motor 21 drives the wheel 15, a motor 22 drives the wheel 16, a motor 23 drives the wheel 17 and a motor 24 drives the wheel 18, as will be described more fully hereinafter.

As shown, the motors 21 and 22 are disposed on one side of the frame member 10 and the motors 23 and 24 are on the other side. Each motor frame is rotatively mounted between a pair of longitudinally extending arms on the frame member 10, the motor 21 being mounted between arms 25 and 26, the motor 22 between arms 26 and 27, the motor 23 between arms 28 and 29, and the motor 24 between arms 29 and 30. The motor frames are mounted on roller bearings 31 encased in the supporting arms, as shown in Fig. 2.

Each wheel is mounted on an individual axle which is independently suspended on a bell crank arrangement of levers oscillating about an axis through the center line of the motor which drives the axle through a double reduction gear unit. The gear unit for each motor is enclosed in a gear case which functions as one of the levers for securing the axle to the motor frame, the gear case being secured to one end of the motor frame. An extension arm is provided on the end of each motor opposite the gear case to assist in supporting the wheel axle.

As shown, the gear housings for the motors 21 and 23 are resiliently connected to one end of the frame member 10 by means of the spring 11 and the gear housing for the motors 22 and 24 are connected to the opposite end of the frame member 10 by the spring 12. The ends of the springs are connected to the tops of the gear cases by spring shackles 32. Therefore, each wheel and its driving motor comprise an individual unit which may oscillate about an axis through the center line of the motor, the movement of the wheels being controlled by the springs 11 and 12.

Referring to Fig. 2, it will be seen that the gear case 33 encloses a double reduction gear train comprising a gear wheel 34, which is secured to an axle 35 for the truck wheel 17, an idler reduction gear 36 and a pinion 37 mounted on the shaft of the motor 23. The axle 35 is mounted on roller bearings 38 and 39, the bearing 38 being enclosed in the gear case 33 and the bearing 39 being enclosed in the end of an extension arm 41 which may be formed integrally with the frame of the motor 23. The gear case 33 may be rigidly secured to the motor frame by a plurality of bolts 42.

In this manner the gear case 33 and the arm 41 cooperate to secure the axle 35 to the frame of the motor 23, the axle being driven by the motor 23 and rotating in the bearings 38 and 39, thereby insuring that accurate gear center distances will be maintained. The idler gear unit 36 is also mounted on roller bearings 43 and 44 which are enclosed in the gear housing 33.

As stated hereinbefore, the wheel 17 may be equipped with dual tires 45 and 46 which may be mounted on rims 47 and 48, respectively. The rims 47 and 48 are bolted to a hub 49 which is secured to the end of the axle 35 by stud bolts 51. The tire rims 47 and 48 can be removed from the hub 49 by taking out the bolts 52, or if desired the entire wheel can be taken off the axle by removing the bolts 51.

If desired, a brake mechanism may be provided in the space 53 between the gear case 33 and the wheel hub 49, thereby providing an enclosed brake, operating directly on the wheel. It will be observed that a space 54 is also available between the axle 35 and the frame of the motor 23 wherein a brake mechanism may be provided which would operate on the axle 35. A sleeve 55, which is shown enclosing the axle, may be readily removed or changed to accommodate the brake mechanism.

From the foregoing description, it is evident that I have provided a drive mechanism for electrically-propelled vehicles which is simple in construction and efficient in operation. By utilizing the truck structure herein described each wheel is independently driven by an electric motor, thereby avoiding the use of differential mechanisms. Furthermore, the provision of the double reduction gearing, as described, permits the use of high speed motors which are light in construction and efficient in operation.

I do not desire to be restricted to the specific embodiment of my invention herein shown and described, since it is evident that it may be changed and modified without departing from the spirit and scope of my invention as defined in the appended claims.

I claim as my invention:

1. In a vehicle truck, in combination, a truck frame, a motor having its shaft disposed transversely of the truck, the motor frame being rotatively mounted in the truck frame on an axis through the longitudinal center line of the motor, arms extending from the motor frame, a wheel axle rotatively mounted in said arms, a reduction gearing interposed between the motor shaft and the wheel axle to transmit power from the motor to the axle, a gear case for enclosing the reduction gearing, and spring means for resiliently connecting the gear case to said frame member, thereby permitting the wheel axle to oscillate about the longitudinal center line of the motor.

2. In a vehicle truck, in combination, a truck frame, a motor having its shaft disposed transversely of the truck, the motor frame being rotatively mounted in the truck frame on an axis through the longitudinal center line of the motor, a pair of arms extending from the motor frame, a wheel axle rotatively mounted in said arms, a gear train housing constituting one of said arms, a gear train within the housing for transmitting power from the motor shaft to the axle, and spring means for resiliently connecting the gear housing to said frame member, thereby permitting the wheel axle to oscillate about the longitudinal center line of the motor.

3. A four-wheel drive vehicle truck comprising a frame member disposed transversely of the truck, four wheels for driving the vehicle, a motor having its shaft disposed transversely of the truck for independently driving each wheel, means for rotatively securing each of the motor frames to said frame member on an axis through the longitudinal center lines of a pair of motors, two of said motors being disposed on each side of the frame member, a pair of arms extending from such motor frame, an axle for each wheel rotatively mounted in the arms on the motor which drives the wheel to permit the wheel to oscillate about the longitudinal center line of the motor independently of the other wheels, a gear housing constituting one of said arms for each motor, and a gear train disposed within each of said housings for independently transmitting power from the shaft of each motor to its respective axle.

4. A four-wheel drive vehicle truck comprising a frame member disposed transversely of the truck, four wheels for driving the vehicle, a motor having its shaft disposed transversely of the truck for independently driving each wheel, means for rotatively securing each of the motor frames to said frame member on an axis through the longitudinal center lines of a pair of motors, two of said motors being disposed on each side of the frame member, a pair of arms extending from each motor frame, an axle for each wheel rotatively mounted in the arms on the motor which drives the wheel to permit the wheel to oscillate about the longitudinal center line of the motor independently of the other wheels, a gear housing constituting one of said arms for each motor, a gear train disposed within each of said housings for independently transmitting power from the shaft of each motor to its respective axle, and spring means disposed longitudinally of the truck for resiliently connecting the gear housings to the frame member.

HAROLD F. HANSON.